US007970490B2

(12) United States Patent
Fellows et al.

(10) Patent No.: US 7,970,490 B2
(45) Date of Patent: Jun. 28, 2011

(54) ARTICLE DISPENSING SYSTEM

(75) Inventors: Eugene E. Fellows, Breinigsville, PA (US); Lawrence C. Hardy, Cresco, PA (US)

(73) Assignee: Integration and Automation Solutions, Inc., Allentown, PA (US)

( * ) Notice: Subject to any disclaimer, the term of this patent is extended or adjusted under 35 U.S.C. 154(b) by 0 days.

(21) Appl. No.: 12/082,855

(22) Filed: Apr. 14, 2008

(65) Prior Publication Data

US 2009/0255947 A1 Oct. 15, 2009

(51) Int. Cl.
*G06F 17/00* (2006.01)

(52) U.S. Cl. ........ 700/235; 700/240; 700/243; 700/231; 221/5

(58) Field of Classification Search .......... 700/231-244; 221/236
See application file for complete search history.

(56) References Cited

U.S. PATENT DOCUMENTS 2,868,386 A 1/1959 Seyforth
5,206,814 A * 4/1993 Cahlander et al. ............ 700/234
5,251,782 A 10/1993 Crosby et al.
5,344,042 A 9/1994 Crosby et al.
5,468,110 A * 11/1995 McDonald et al. ........... 414/273
5,625,562 A * 4/1997 Veeneman et al. ............ 700/235
5,713,487 A 2/1998 Coughlin
5,880,443 A * 3/1999 McDonald et al. ........... 235/375
6,230,927 B1 5/2001 Schoonen et al. .............. 221/10
6,370,841 B1 * 4/2002 Chudy et al. .................... 53/411
6,490,502 B2 * 12/2002 Fellows et al. ................ 700/231
6,625,952 B1 * 9/2003 Chudy et al. .................... 53/168
7,151,982 B2 12/2006 Liff et al.
7,289,879 B2 * 10/2007 William et al. ............... 700/235
7,610,115 B2 * 10/2009 Rob et al. ...................... 700/245
2002/0173875 A1 11/2002 Wallace et al.
2004/0034447 A1 * 2/2004 Vollm .......................... 700/235
2005/0065645 A1 3/2005 Liff et al. ...................... 700/241
2006/0272765 A1 * 12/2006 Kortge et al. ................. 156/215

FOREIGN PATENT DOCUMENTS

WO WO 2007-133660 11/2007

* cited by examiner

*Primary Examiner* — Michael K Collins
(74) *Attorney, Agent, or Firm* — Drinker Biddle & Reath LLP

(57) ABSTRACT

An article dispensing system is provided which can be customized to selectively store and dispense multiple desired articles to suitable containers. The system of the invention is particularly relevant for items which can be stored on hangers in a vertical format and dispensed therefrom.

3 Claims, 5 Drawing Sheets

ARTICLE DISPENSING SYSTEM

BACKGROUND

Advances in medicine and health care allow people to live longer and more productive lives. As people age, they require medications for many reasons, including to remain healthy, and in some instances, to remain alive. Advances in medicine also allow people to enjoy conveniences and comforts not otherwise available (e.g., cold remedies, allergy medications, etc.).

Pharmacies, including those in hospitals, nursing homes, and the like, must dispense multiple medications to multiple patients on ever-changing schedules. Ensuring that each patient receives the correct medication at all times presents significant logistical problems to those responsible for prescribing, dispensing, and administering the medications. Even when everything in the dispensing system works properly, the logistics and paperwork required to dispense all medications to multiple patients correctly can be very time-consuming, labor-intensive, and expensive.

The "human factor" in the supply system can also become a source of error. Unfortunately, at times, the wrong medications to be dispensed to a patient. This may occur for many reasons, including insufficient time, excessive workload, and the like. The potentially harmful consequences of incorrectly dispensing medications to patients requires no elaboration.

As more and more medications are prescribed to patients, pharmaceutical companies and drug distributors increasingly rely on "blister-packed" drugs. Blister packaging for pharmaceutical products, sometimes also referred to as "bubble packaging" or "push through packaging," is a type of packaging in which individual pills (tablets, capsules, caplets, etc.) are contained within discrete locations on a plastic, cardboard, or foil card. Often, pills are stored within discrete, pre-formed indentations on a plastic card, and the pills are sealed within those indentations by affixing a thin covering sheet of paper, plastic, or foil over the indentations. Pills can be dispensed from the blister package one at a time by pushing the pill through the covering sheet.

The convenience and security of blister-packed drugs has influenced the use of blister packaging for many non-drug items, as well. A blister-packed item is verified at the time of packaging to contain the correct item and the correct number of items. Additionally, the blister packaging can be shaped and sized to deter theft of the packaged item, by making theft cumbersome and inconvenient.

Prescriptions and non-drug product orders fulfilled using blister-packed items benefit from fewer human-based errors. However, dispensing of even blister-packed items is subject to errors of human intervention, such as selection of the incorrect blister pack. The art lacks an efficient or convenient way to automate the selection and distribution of blister-packaged items. Known systems and apparatuses are not amenable to the storage and distribution of blister-packaged pharmaceuticals. Known systems can accommodate and handle items having a regular and/or defined size and shape. The irregular and varied shapes and sizes of blister-packaged products renders them unusable with known apparatuses.

In order to further minimize errors in the dispensation of drugs contained in blister packs, or of any items contained in blister packs, what is needed is a way to minimize human error in the dispensation of such items. Additionally, in order to increase the speed and efficiency with which blister-packaged items are dispensed, what is needed is a way to automate the dispensation of blister-packaged items. The article dispensing system disclosed herein addresses and meets these needs.

BRIEF SUMMARY

An article dispensing system is disclosed. The article dispensing system includes a) a dispensing module including a movable article carrier having disposed thereupon a plurality of moveable article supports on which to store a plurality of articles for dispensing, each article comprising a pre-filled package containing at least one pre-selected item, the carrier being movable relative to a dispensing station; b) a system controller for receiving data representative of the identity of articles stored on the carrier and representative of a specific article to be dispensed, the controller being operatively coupled to the carrier to cause the carrier to move to a position in which the specific article to be dispensed is brought to the dispensing station; c) a pick head at the dispensing station to engage an article, withdraw it from the carrier, and direct the article to a container; and d) an article scanning station downstream of the dispensing station, the article scanning station comprising at least one scanner for scanning and identifying the selected article.

Another article dispensing system to dispense a selected product from a plurality of products is disclosed. The article dispensing system includes a) a dispensing station including a rotatable carousel having disposed thereupon a plurality of moveable product hangers on which to store the plurality of products, each product comprising a pre-filled package containing at least one pre-selected item, the rotatable carousel comprising a carousel positioning device, a drive motor, and a carousel position detector to determine the rotational position of the carousel relative to the dispensing station; b) a system controller including a means for data input to i) identify the plurality of products contained on the hangers, and ii) select the specific product to be dispensed from the product dispensing system, the controller operatively coupled to the carousel positioning device and the carousel position detector to rotate the carousel so as to position at the dispensing station the hanger containing the selected product, wherein the controller includes logic to obtain the selected product from the hanger on the carousel and to subsequently dispense the product from the system; c) a pick head comprising a means to temporarily hold a product upon contact of the product with the pick head, until such time when the controller provides a signal to dispense the product, and d) a product detecting station, the product detecting station comprising at least one means for detecting and identifying the selected product.

A method of dispensing a selected product from a plurality of products is disclosed. The method includes a) providing an article dispensing system comprising an article scanning station, the article scanning station comprising at least two scanners for scanning a selected product; b) selecting a product, each product comprising a pre-filled package containing at least one pre-selected item; c) placing the selected product into the article scanning station; d) scanning a first UPC on the selected product using a first scanner, the first UPC being indicative of the identity of the pre-selected item; e) identifying the selected product based on the UPC; f) labeling the selected product with a label corresponding to the identity of the selected product; g) scanning a second UPC on the label using a second scanner, the second UPC being associated with the identity of a patient intended to receive the pre-selected item; h) verifying that the pre-selected item and the label correspond; and i) dispensing the selected product from the article dispensing system.

BRIEF DESCRIPTION OF THE DRAWINGS

The accompanying drawings, which are included to provide a further understanding of the article dispensing system and are incorporated in and constitute a part of this specification, illustrate embodiments of the system and together with the description serve to explain the principles of the system.

Similar reference characters refer to similar parts throughout the several views of the drawings.

DETAILED DESCRIPTION

Figure 1:
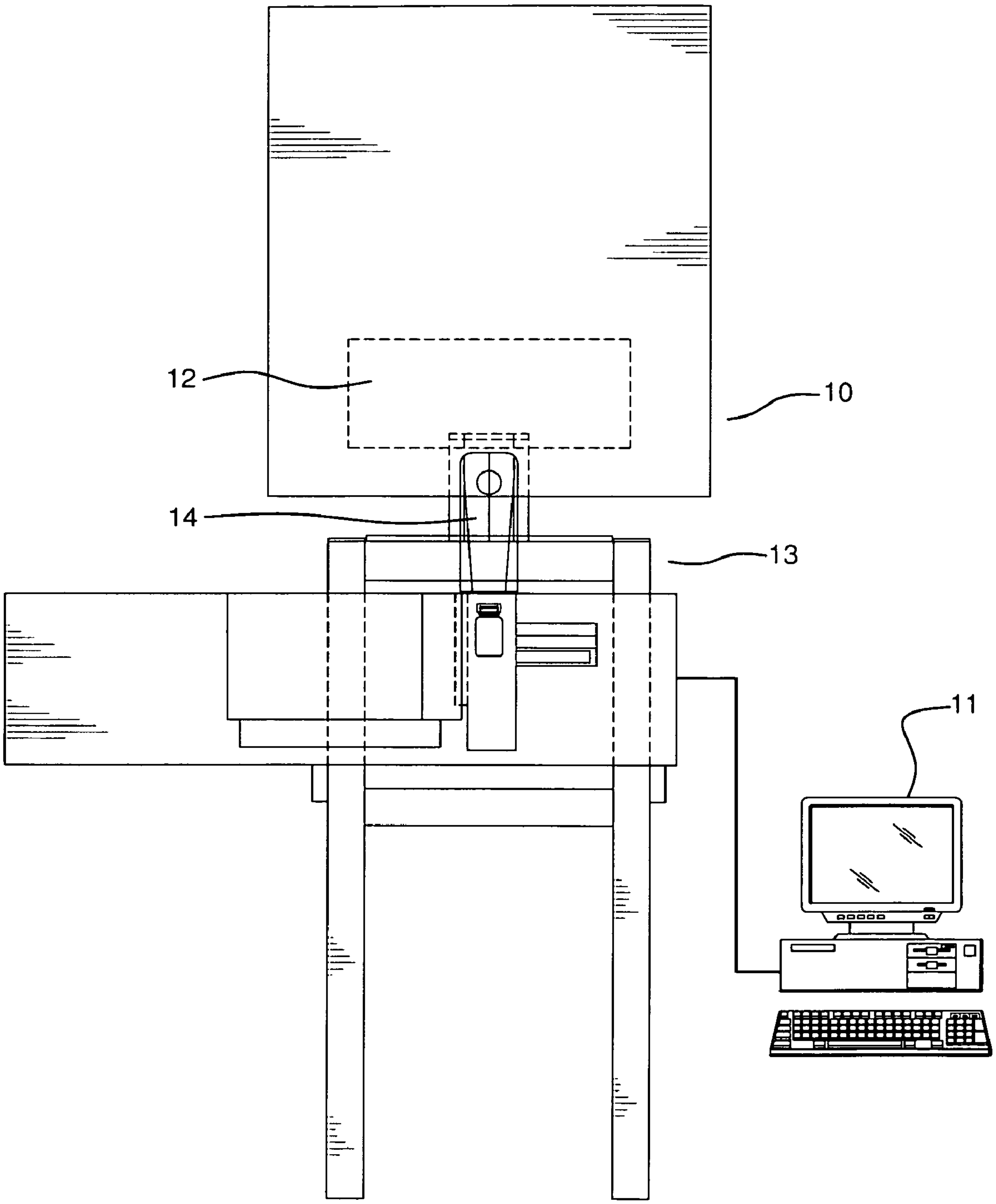
FIG. 1 is an illustration of an overall structure of an article dispensing system.
Figure 2:
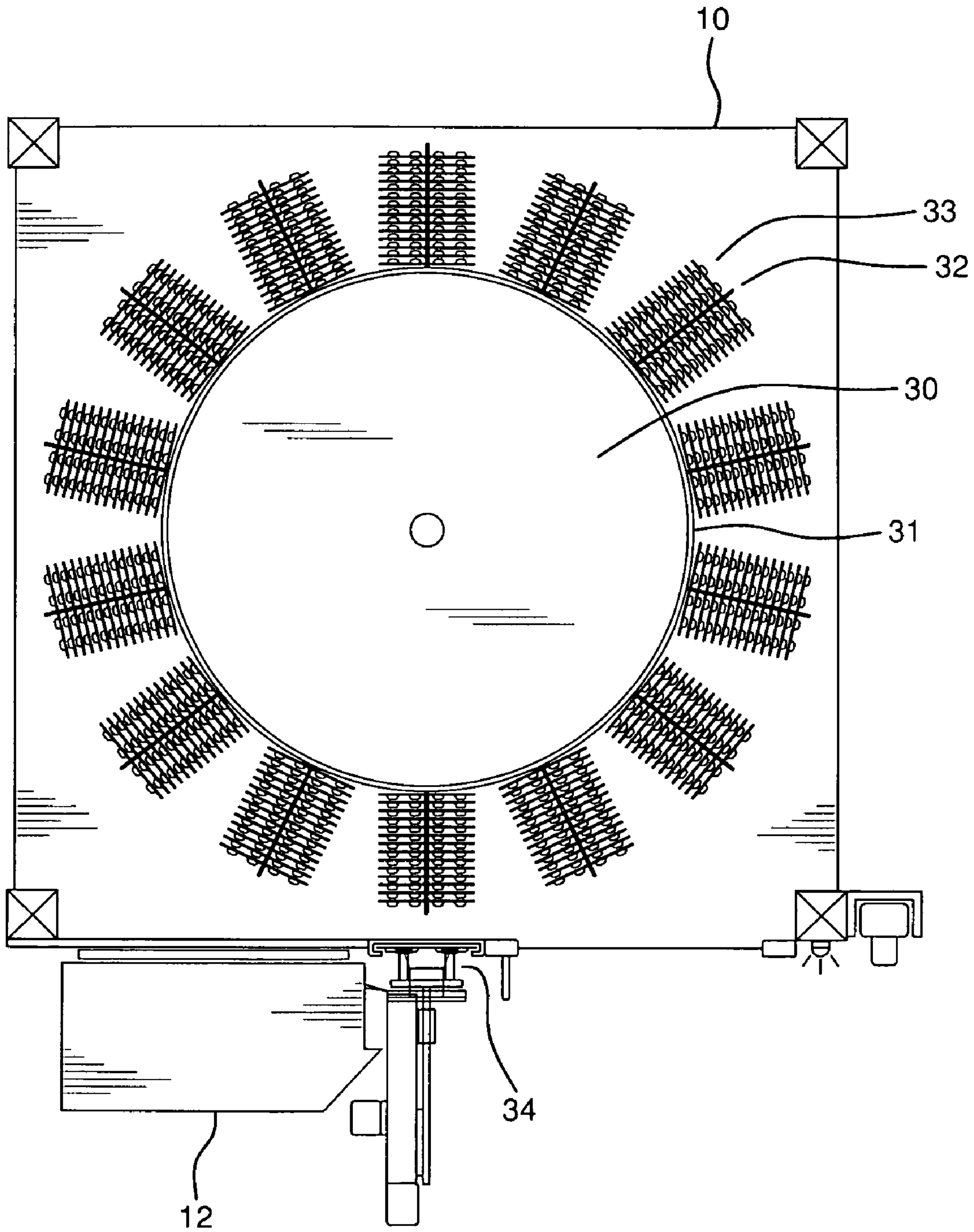
FIG. 2 depicts a top view of an article dispensing system in which blister-packaged items are stored on peg-type hangers.
Figure 3:
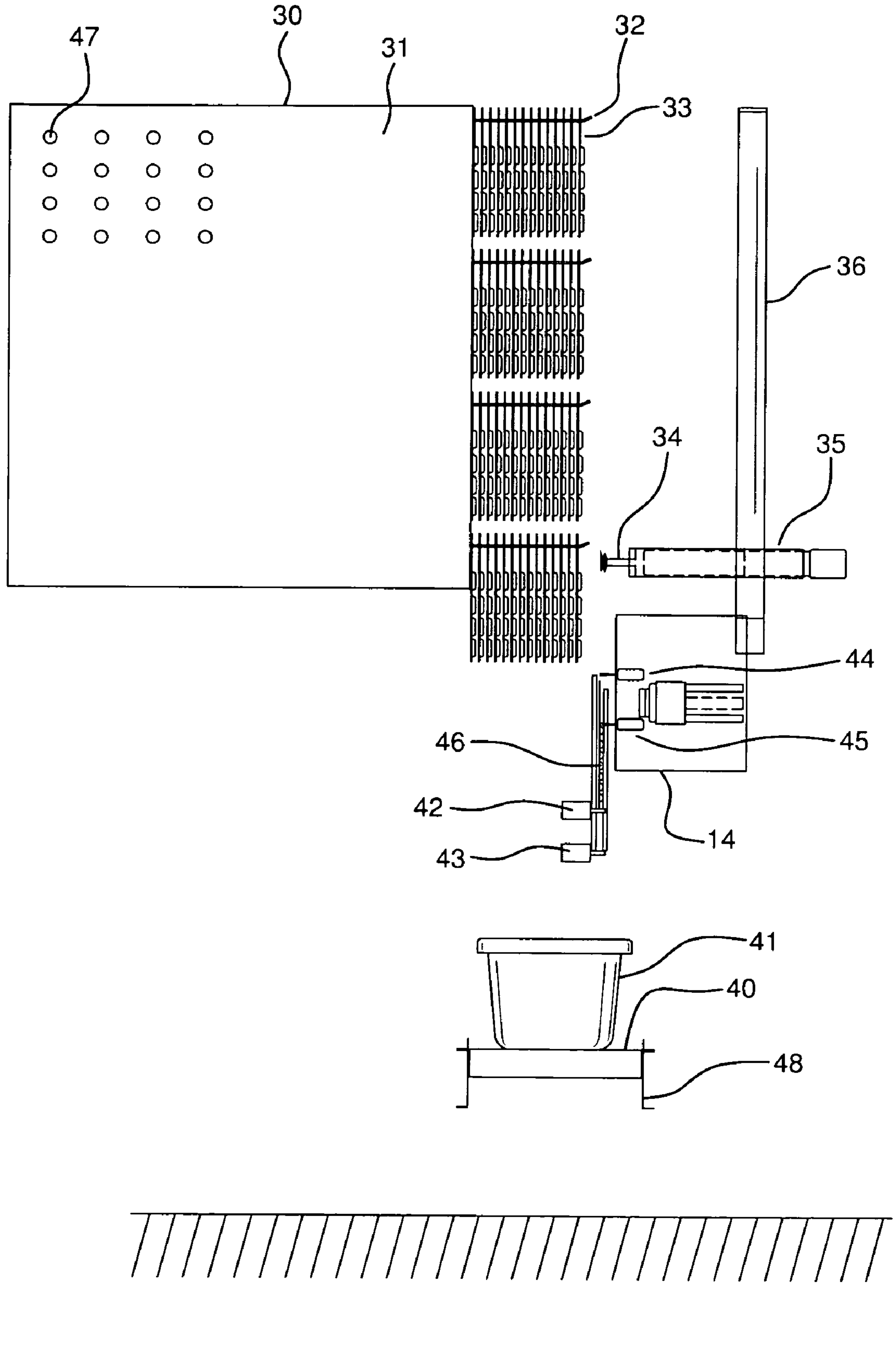
FIG. 3 depicts a side view of an apparatus an article dispensing system shown in FIG. 2.
Figure 4:
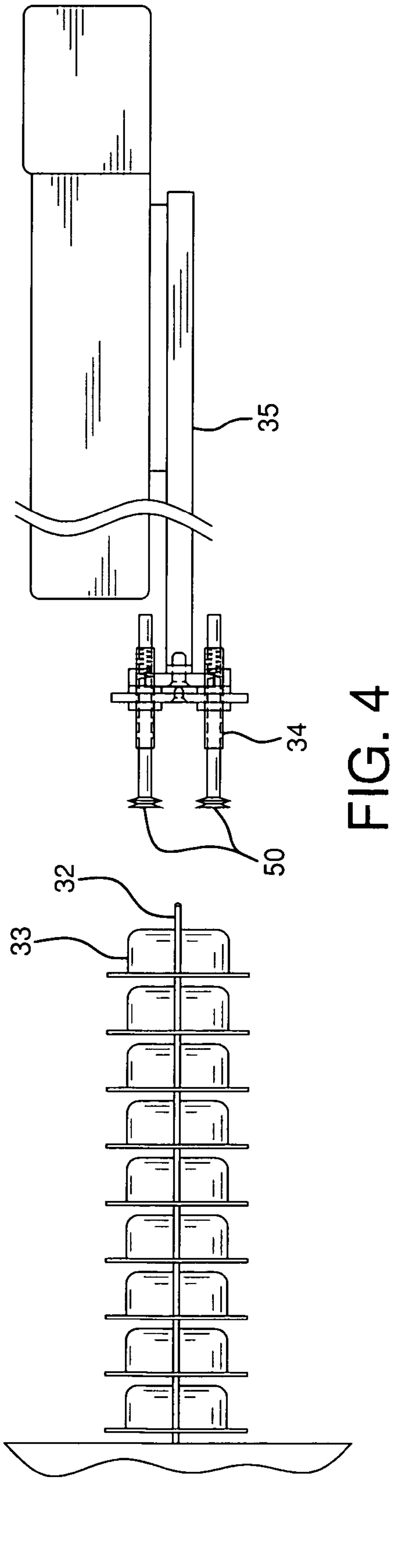
FIG. 4 depicts a top view of a an article dispensing system in which blister-packaged items are stored on peg-type hangers and in which a moveable pick head is aligned with an item prior to picking.
Figure 5:
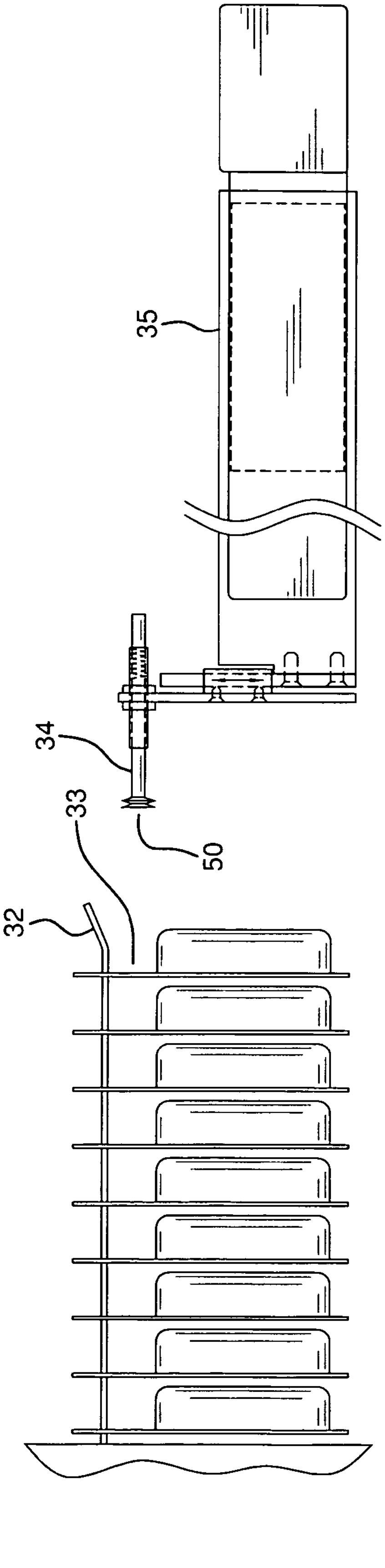
FIG. 5 depicts a side view of a an article dispensing system shown in FIG. 4.
Figure 6:
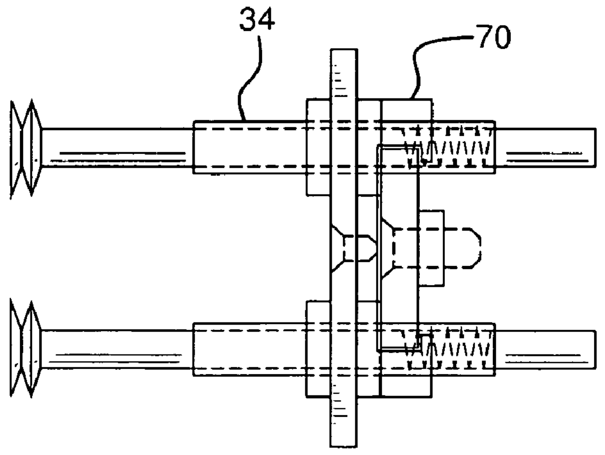
FIG. 6 depicts a top view of a moveable pick head of an article dispensing system.
Figure 7:
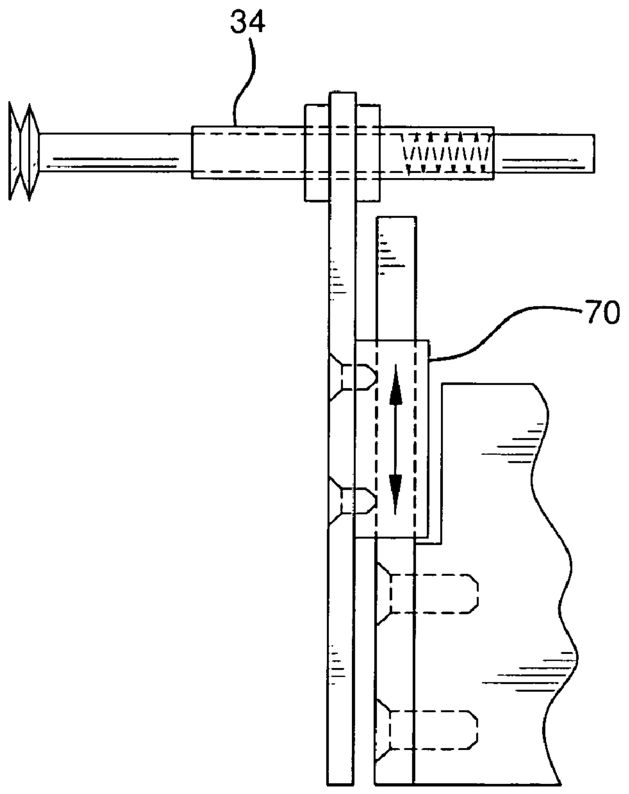
FIG. 7 depicts a side view of a moveable pick head shown in FIG. 6.

The drawings illustrate an apparatus to selectively dispense articles—also referred to herein as "products"—selected from a plurality of articles, schematically depicted in FIGS. 1-3. Specifically, the apparatus comprises an article dispensing system 10 to store and dispense articles therefrom, a container transport system 48 to transport containers 41 to and from the article dispensing system 10 to receive articles dispensed therefrom and a system controller 11 to control the operation of the article dispensing system 10 and the container transport system 48, as described more fully hereinafter. The apparatus as depicted may comprise a plurality of article dispensing systems 10 disposed vertically and/or horizontally relative to each other, or in remote locations with respect to one another, to increase the capacity and selection of articles dispensed from the apparatus.

As shown in FIGS. 1 and 2, each article dispensing system 10 comprises a dispensing module 12 including a moveable article carrier, exemplified in FIG. 2 by reference numeral 30, having disposed thereupon a plurality of moveable article supports on which to store a plurality of articles for dispensing. The moveable article carrier is moveable relative to a dispensing station 48.

In one embodiment, the moveable article carrier comprises a support structure having a face with a plurality of supports disposed thereupon. In another embodiment, which is depicted in Figure C, the article carrier can comprise a carousel 30 rotatably mounted on a base 13, a drive mechanism to selectively rotate the carousel 30, a programmable system controller 11 including logic to control the operation of the article dispensing system 10 and a carousel position sensor or shaft encoder to sense or indicate the position of the carousel 30 relative to at least one of a plurality of predetermined carousel positions.

The drive mechanism can comprise a motor and a drive wheel disposed to engage the carousel 30. The drive mechanism of the carousel may, as just one example, be configured as set forth in U.S. Pat. No. 6,490,502, which is incorporated herein by reference in its entirety. In an embodiment, the drive mechanism and the carousel position sensor or indicator comprise a carousel positioning device. The carousel drive motor, the controller 11, scanners 44 and 45, and related electromechanical devices are coupled to a power supply to provide power from a power source to power the various electromechanical devices, scanner/detectors and control logic.

The system controller 11 is operatively coupled to the carrier to cause the carrier to move to a position in which the specific article to be dispensed in brought to the dispensing station 48. The controller 11 can receive data representative of the identity of articles stored on the carrier. The controller 11 includes a means to accept input, such as from a keyboard, touchscreen, scanner, or receiver for voice-recognition, to pick and distribute a plurality of products to a corresponding container 41. In addition, a remote host computer or dispensing system control may be used to input the plurality of products.

When operating in the dispensing mode, a container 41 is transported from a container loading station to the dispensing station 48 and the carousel 30 rotates the appropriate product to be picked by the pick head 34, as described more fully below. The container 41 may include identifying information that can be detected by an optional container identification scanner. As described more fully below, a container identification scanner can be operably linked to the controller 11 to signal a request for a particular product 33 to be picked and dispensed by the article dispensing system. When both the container 41 and the carousel 30 are aligned as required to pick and dispense the correct product 33, the product 33 is picked by the pick head 34, scanned at the product detecting station 14, and when the product 33 is identified as the correct product by the controller 11, the product 33 is dispensed into the container 41. The scanning, picking and dispensing continues until all of the requested products are dispensed into the container 41.

The apparatus disclosed herein features a moveable article carrier that has a perforated surface. In one embodiment, the article carrier has a surface with multiple holes 47 that can accommodate various multiple peg-type hangers 32 upon which various articles, such as blister-packaged products 33, can be stored. In one embodiment, all of the holes on the surface of the article carrier are regularly spaced. As an example, the holes may be spaced approximately one inch apart. In another embodiment, the holes are irregularly spaced. The hangers 32 can be arranged and spaced in the holes by the user, as necessary to accommodate the size and shape of a blister pack 33, such that the blister pack 33 does not contact any other blister pack on any other hanger on the surface of the article carrier. It will be understood by the skilled artisan that the blister packs 33 stored on the article carrier must move substantially freely along the hanger 32 for removal of the blister pack 33 from the hanger 32, as well as for stocking blister packs 33 on the hanger 32.

In the embodiment shown in Figure C, all hangers 32 are evenly spaced about the circumference of a carousel surface 31. In another embodiment, the hangers 32 are not evenly spaced on the carousel surface 31. In any arrangement of hooks and/or holes on the carousel surface 31, the skilled artisan, when equipped with the disclosure set forth herein, will know how to arrange hangers on the carousel surface 31 such that the blister-packed products stored thereupon do not contact any other blister pack on any other hanger on the carousel surface 31.

The dispensing system 10 also includes a pick head 34 to engage and remove articles from a hanger 32 on the article carrier. In one embodiment, the pick head 34 engages and removes an article from a hanger on a carousel 30. The pick head 34 is attached to a pick arm 35 that can move the pick head 34 towards the carousel 30 to pick product 33 from the hanger 32, and to move the pick head 34 away from the carousel 30 to release product and direct the product to a container 41. The pick arm 35 may be attached to an elevating component 36, such as a linear activator or a screw drive, that enables the movement of the pick head 34 vertically up and down in order to pick product 33 from a hanger 32 at a higher or lower position, respectively, on the carousel surface 31. The movement and position of the pick head 34 is controlled by the programmable controller 11. The positioning of the pick head 34 with the product 33 to be picked by the pick head 34 is determined by a command from the programmable controller 11, through a combination of positioning the pick head 34 by way of movement of the pick arm 35 and/or elevating component, and by rotatably positioning the carousel 30.

In an embodiment, the pick head 34 is fixedly attached to the pick arm 35. In another embodiment, the pick head 34 is flexibly attached to the pick arm 35. A flexibly attached pick head 34 allows for minor deflections of the pick head 34 independent of the movement of the pick arm 35. Any conventional pick head system may be used in the present invention. The hanger 32 may have a slight upturn at the outer end of the hanger 32 to prevent the product 33 from falling off of the hanger 32 as the carousel 30 rotates. Deflection of the pick head 34 may be desired if a hanger 32 has a slight upturn at the outer end. As an example, when the pick arm 35 moves the pick head 34 away from the carousel 30 after picking an article from a hanger 32 that has a slight upturn at the outer end, a flexibly attached pick head 34 will allow a minor upward deflection in the pick head 34 so that the pick head 34 does not inadvertently release the article when withdrawing the article from the hanger 32.

In an embodiment, the pick head 34 picks an article from a hanger 32 by means of a vacuum-assisted contact surface 50 on the pick head 34. A vacuum-assisted contact surface 50 is preferably made of a material that can form a temporary yet substantially sealed contact area with the surface of a product 33, such as the surface of a blister package. The structure of the vacuum-assisted contact surface 50 is designed to have sufficient strength and rigidity to pick, hold, and withdraw an article from a hanger 32. In an embodiment, a contact surface 50 can be made of rubber. However, in view of the disclosure set forth herein, the skilled artisan will understand that the contact surface 50 of a pick head 34 can be made of any material that can be manipulated in any manner that will enable the contact surface 50 to form a sufficiently-strong sealed contact area with a blister-packaged product. A contact area is "sufficiently strong" if it enables the pick head 34 to pick, hold, and withdraw an article from a hanger 32. Vacuum-assisted pick heads are well known in the art, and therefore, no further discussion is needed herein.

The programmable controller 11 can be programmed to correspond to any configuration of hangers 32, any configuration or style of perforated surface of a moveable article carrier, and any arrangement of the hangers 32 on the surface. In an embodiment, the programmable controller 11 is programmed to correspond to a specific configuration of hangers 32 on a carousel 30. The location of each hanger 32 can be programmed into the controller 11, such that the controller 11 will direct the pick head 34 to move to the location of a particular hanger 32 on the carousel surface 31 in order to pick an article from that particular hanger 32. The location of one or a plurality of specific articles can be programmed into the controller 11 based on the identity of the article present on each individual hanger 32. As an example, the controller 11 can be programmed to recognize that a hanger 32 at a particular location contains a specific product. The controller 11 may detect the presence of a hanger in a hole.

The controller 11 can also be programmed according to the quantity of product stored on a specific hanger. In another example, the controller 11 can be programmed to recognize that a hanger 32 at a particular location contains, for example, ten (10) units of an article of a first type at the end of the hanger 32 furthest away from the carousel 30, and that on the end of the hanger 32 closest to the carousel 30, the hanger 32 contains, for example, five (5) units of an article of a second type. It will be understood that the controller 11 can be re-programmed at any time to accommodate a new configuration of hangers 32 and/or articles, as desired by the user.

The controller 11 can also be programmed to control the distance of travel of the pick head 34 towards or away from the moveable article carrier. As an example, the controller 11 can be programmed to reflect the maximum possible distance of travel of the pick head 34 towards a carousel 30, and to correlate this travel distance with the absence of product 33 on a hanger 32. Similarly, the controller 11 can be programmed to control the minimum possible distance of travel of the pick head 34 towards the carousel 30 before encountering product 33 on a hanger 32, and to correlate this travel distance with the presence of the maximum amount of product 33 on a hanger 32.

The distance of travel of the pick head 34 either towards or away from the carousel 30 can be detected by using any means known in the art. In an embodiment, the distance of travel of the pick head 34 towards or away from the carousel 30 is measured and monitored using a stepper motor, and by recording pulses of the stepper motor. In another embodiment, the maximum distance of travel of the pick head 34 towards the carousel 30 is detected by means of at least one sensor.

After the pick head 34 contacts a blister-packaged product 33 from a hanger 32, the pick arm 35 retracts the pick head 34 to withdraw the product 33 from the hanger 32. The pick head 34 then releases the product 33. When the pick head 34 picks a product 33 by means of a vacuum assist, the product is subsequently released by reversing or discontinuing the vacuum assist.

In an embodiment, the release of product 33 from the pick head 34 allows the product to drop into a container 41 positioned below the pick head 34. A container 41 is preferably transported to and from the detecting station 14 by a conveyor 40. In an embodiment, a container 41 includes distinct identifying information. This identifying information may be detected by a detector located in spaced relationship with the detecting station 14. The controller 11 can be programmed to detect the container 41, to associate the unique container with a unique product order, and to command the article dispensing system to pick and dispense one or more specific products 33 to be received by the container 41.

In another embodiment, the release of product 33 from the pick head 34 allows the product to drop through a detecting station 14 downstream of the dispensing station 48, where the product can be detected as the product passes through the detecting station and into a container 41 positioned at a dispensing station 48 adjacent to the detecting station 14. In an embodiment, a dispending station 48 is situated below a detecting station 14. The detecting station 14 includes at least one product detector, described more fully below.

In another embodiment, the detecting station 14 comprises at least one product compartment or channel 46. The release of product 33 from the pick head 34 allows the product to drop into the product compartment 46 in the detecting station 14. In the apparatus disclosed herein, as set forth more fully below, a product detector is a scanner or other detecting device 44 used to identify a product in the product compartment 46. In a preferred embodiment, a product detecting station 14 comprises two product detectors 44 and 45, to scan product disposed within, or in close proximity to the product compartment 46. The product is held in the product compartment 46 for detection before the product is dropped into a container 41 positioned at the dispensing station 48 below the detecting station 14.

After a product 33 has been detected in the product compartment 46, the product is released from the product compartment 46, allowing the product 33 to drop into the container 41 positioned at the dispensing station 48 below the detecting station 14. The product compartment 46 therefore may comprise an adjustable means that enables the product compartment 46 to store product 33 received from the pick head 34. The adjustable means can release the stored product 33, so that the product can be received by the container 41 positioned at the dispensing station 48 below the detecting station 14. The controller 11 can be programmed to manipulate the adjustable means in the product compartment 46 to store and release the product 33 on command.

In the apparatus disclosed herein, the product compartment 46 is also configured to store a product 33 to permit the scanning of at least one identifying feature of the product. As an example, an identifying feature may be a machine-readable code, such as, but not limited to, a universal product code ("UPC"). When the detector 44 identifies a UPC on a product 33, the controller 11 can cross-reference that information with product-identifying information for that particular UPC. Product-identifying information and UPC code information (or other such coding information) can be programmed into the controller 11 and specified by the user. When a product detecting station 14 comprises two or more detecting devices, each detecting device can detect a distinct identifying feature of the product 33. The multiple identifying features can be programmed into the controller 11 by the user.

In an embodiment, a product detecting station comprises two detectors 44 and 45. The first detector 44 identifies the product 33 and an identifying label is applied to the product 33 based on the identity of the product 33. The second detector 45 then verifies that the correct label was applied to the product 33.

In another aspect, a detecting station can use another means or method to detect a product, such as radio frequency identification (RFID), magnetic identification methods, among others.

In a preferred embodiment, the product compartment 46 comprises two or more product detectors 44, 45 disposed within, or in close proximity to, the product compartment 46. In one embodiment, one or more of the product detectors are contained within the product detecting station 14. Multiple product detectors 44, 45, can be individually configured, using the controller 11, to recognize the same UPC or, in the alternative, each product detector can be configured to recognize a different UPC. As an example, in an article dispensing system having two (2) product detectors 44, 45, the first product detector 44 may be configured to recognize a first UPC associated with the identity of a drug product contained within a blister package and the second product detector 45 may be configured to recognize a second UPC on the same blister package, wherein the second UPC is associated with the identity of a patient who is intended to receive the drug product contained within the blister package.

In an aspect of the apparatus described herein, the product compartment 46 can accommodate a product 33 at multiple discrete locations within the product compartment 46. Each discrete location within the product compartment in referred to herein as a "subcompartment." In one embodiment, two or more product detectors each detect the product 33 as the product 33 is stored in one subcompartment within the product compartment 46. In another embodiment of the invention, two or more product detectors each detect the product as the product 33 is stored in two or more subcompartments within the product compartment 46.

A product 33 may be moved within the product compartment 46 by either an active or passive method. A passive method of moving a product 33 within the product compartment 46 includes the use of gravity. As an example, a product compartment 46 may have several subcompartments that are vertically adjacent one another in succession. A product 33 is stored within the uppermost vertical subcompartment within the product compartment 46 by an adjustable, controllable physical means that can prevent the product 33 from moving downward through the product compartment 46. In a passive method, each successive vertical subcompartment is situated immediately below the previous vertical subcompartment and is accessible by the product 33 when the product 33 is released from the subcompartment immediately above.

An active method of moving a product 33 within the product compartment 46 may include the use of a mechanical means, resulting in either direct or indirect movement of the product 33 within the product compartment 46. An active method of moving a product 33 within the product compartment 46 can be effected by the controller 11, as programmed by the user. As an example of indirect active movement of a product 33 through the product compartment 46, the configuration of vertical, successive subcompartments as set forth above may be configured to control the transfer of product 33 through successively lower vertical subcompartments by means of an adjustable stop at the bottom of each subcompartment. The controller 11 can be programmed to open the stop at the bottom of a subcompartment to allow a product to drop into the subcompartment immediately below.

When the apparatus set forth herein is configured with a series of two or more successive vertical subcompartments within the product compartment 46, each subcompartment may have associated with it one or more product detectors 44, 45. Each product detector is disposed within or in close proximity to the product compartment 46. As an example, a product 33 is dropped by the pick arm 34 and received by the uppermost vertical subcompartment, where a first identifying characteristic is detected by a first detector. The product is released from the first subcompartment and received by the second subcompartment immediately below, where a second identifying characteristic is detected by a second detector. In a preferred embodiment, the first and second identifying characteristics are UPC symbols that are recognized by the controller 11, as set forth more fully above.

A product detecting station 14 can include a means for labeling a product 33. In an embodiment, a product detecting station 14 includes a means for labeling a product 33 located within the product compartment 46. In another embodiment, a product detecting station 14 includes a means for labeling a product 33 located within the product detecting station 14, but outside of the product compartment.

In an apparatus as described herein, the labeling means may comprise a label transfer means for obtaining a label. After obtaining a label, the labeling means applies the label to a product 33 located within the product compartment 46. The labeling means may further comprise a means for supplying labels to the transfer means. Additionally, a labeling means may comprise a first control element responsive to the presence of a product 33 within the product compartment 46 and configured to actuate the transfer means and label the product. The labeling means may further comprise a second control responsive to the use of a label by the label transfer means, in order to actuate the label supplying means and resupply the transfer means with another label.

The labeling component may include one or more other features, as required based on the function and use of an article dispensing system as described herein. The skilled artisan, when armed with the disclosure set forth herein, will understand how to prepare and/or adapt a labeling means based on the function and use of an article dispensing system as described herein.

In an aspect, the means for labeling an article comprises at least one powered roller that can be engaged to spin an article comprising a bottle. In one embodiment, a means for labeling an article that comprises at least one powered roller that can be engaged to spin a bottle further comprises a first scanner for scanning a first UPC on the bottle and a second scanner for scanning a second UPC on a label, after a label has been applied to the bottle. As an example, a bottle containing a selected product is inserted into a product detecting station comprising at least one powered roller. The powered roller is engaged to spin the bottle, a first scanner scans a first UPC on the bottle, the product is identified by way of the UPC, and the bottle is labeled with a label corresponding to the identity of the selected product. A second scanner is used to scan a second UPC on the label and, based on a comparison of the first and second UPC's, the article dispensing system verifies that the selected product and the label correspond. If the label and selected product correspond, the bottle is dispensed from the article dispensing system.

In an aspect, the labeling means may comprise a vacuum assist. The label transfer means may use a vacuum-assisted component to obtain a label in order to label a product 33. In another embodiment, the label transfer means may use a reversible vacuum-assisted component in order to place a label on a product 33. As an example, a label transfer means can operate using a positive-pressure airflow or expulsion of air to physically transfer the label from the transfer means to the product 33. In an aspect, a label-transfer means has a dual function, including a vacuum-assist function and a reverse vacuum function (i.e., "blast of air") to hold and subsequently release a label. In an embodiment, one or more detectors may be used to verify that the product 33 is correctly labeled. The controller 11 can be programmed to perform this verification step.

As product is dispensed by release from the pick head 34, or in the alternative, from the bottom of the product channel 46, the dispensed product 33 may pass by one or more sensors integrated with the controller 11 for the purpose of verifying that the product 33 has been picked, and that the product has been dispensed and is no longer associated with the pick head 34 or with the product channel 46. If the verifying sensors do not detect that product 33 has been either picked or dispensed, the controller 11 will halt further product picking and require further input from the operator to resolve the issue. In an embodiment, the product detectors 44, 45 can be used as the verifying sensors for product picking and dispensing.

As shown in FIG. 3, the container transport system may comprise a conveyor 40 or other similar container positioning device that facilitates the movement of containers 41 from a container supply station to a container removal or fulfillment station disposed at opposite ends of the article dispensing system 13. The containers 41 may be manually placed on and removed from the conveyor 40 or the process may be mechanized with the use of state of the art handling equipment.

In an embodiment, a container reject spur may be located adjacent to the dispensing station 48. The controller 11 can be programmed such that the product dispensing system 10 will divert any containers 41 containing incomplete orders as identified by the verifying sensors associated with the controller 11 to the container reject spur. The containers can then be examined to identify any missing products to be supplied or completed by the system operator, as well as any incorrect products that must be removed from the containers.

As will be understood by the skilled artisan, the article dispensing system described herein may include container systems other than the container system described herein to receive dispensed product. Other systems include, but are not limited to, an active receiving system in which the dispensed product is actively channeled to an adjacent or remote storage area, such as by way of a conveyor system.

When in the stocking or restocking mode, the system may be stocked or restocked manually, automatically, or by way of a combination of the two methods of stocking or restocking.

In an embodiment, the system can be restocked manually. By way of a non-limiting example, a dispensing system as set forth herein has one or more areas for restocking product, the areas being accessible to a person replenishing the system (a "replenisher"). These areas are also referred to herein as "replenishment points". Adjacent to or proximate to a replenishment point is a signaling device that is visible or audible to the replenisher. The signaling device provides visual and/or audible cues to the replenisher regarding the identity of the product that needs to be replenished, and the location within the system to where the product should be replenished. The controller 11 optionally provides information to the signaling device regarding the identity of the product to be replenished and the location to where the product should be replenished.

As an example, a signaling device is a light tower. The light tower comprises a separate light corresponding to each vertical row of product hangers within the dispensing system. Additionally, an illuminated replenishment push button is provided in proximity to the light tower. When a replenisher scans a UPC of a product to be restocked, the system will automatically rotate the carousel until the correct hanger reaches the replenishment point. The corresponding light on the light tower will be illuminated, identifying the exact hanger to be replenished, and the replenishment push button will be illuminated. Once the replenishment cycle is complete, the replenisher can push the replenishment push button to signal the completion of the replenishment cycle, to extinguish the light tower and to release the system back to the dispensing mode.

While the article dispensing system has been disclosed with reference to specific embodiments, it is apparent that other embodiments and variations of this system may be devised by others skilled in the art without departing from the true spirit and scope of the invention. The appended claims are intended to be construed to include all such embodiments and equivalent variations.

The invention claimed is:

1. An article dispensing system comprising:

a) a dispensing module including a movable article carrier having disposed thereupon a plurality of moveable article supports on which to store a plurality of articles for dispensing, each article comprising a pre-filled package containing at least one pre-selected item, the carrier being movable relative to a dispensing station;

b) a system controller for receiving data representative of the identity of articles stored on the carrier and representative of a specific article to be dispensed, the controller being operatively coupled to the carrier to cause the carrier to move to a position in which the specific article to be dispensed is brought to the dispensing station;

c) a pick head at the dispensing station to engage an article, withdraw it from the carrier, and direct the article to a container; and d) an article scanning station downstream of the dispensing station, the article scanning station comprising at least one scanner for scanning and identifying the selected article, wherein the article scanning station further comprises a means for applying a label to the article, and wherein the means for labeling comprises:

a. a first scanner for scanning a first UPC on the article; and b. a second scanner for scanning a second UPC on a label after the label has been applied to the article.

2. A method of dispensing a selected product from a plurality of products comprising:

a) providing an article dispensing system comprising an article scanning station, the article scanning station comprising at least two scanners for scanning a selected product;

b) selecting a product, each product comprising a pre-filled package containing at least one pre-selected item;

c) placing the selected product into the article scanning station;

d) scanning a first UPC on the selected product using a first scanner, the first UPC being indicative of the identity of the pre-selected item;

e) identifying the selected product based on the UPC;

f) labeling the selected product with a label corresponding to the identity of the selected product;

g) scanning a second UPC on the label using a second scanner, the second UPC being associated with the identity of a patient intended to receive the pre-selected item;

h) verifying that the pre-selected item and the label correspond; and i) dispensing the selected product from the article dispensing system.

3. An article dispensing system comprising:

a) a dispensing module including a movable article carrier having disposed thereupon a plurality of moveable article supports on which to store a plurality of articles for dispensing, each article comprising a pre-filled package containing at least one pre-selected item, the carrier being movable relative to a dispensing station;

b) a system controller for receiving data representative of the identity of articles stored on the carrier and representative of a specific article to be dispensed, the controller being operatively coupled to the carrier to cause the carrier to move to a position in which the specific article to be dispensed is brought to the dispensing station;

c) a pick head at the dispensing station to engage an article, withdraw it from the carrier, and direct the article to a container; and d) an article scanning station downstream of the dispensing station, the article scanning station comprising at least one scanner for scanning and identifying the selected article, wherein the product dispensing station is further configured to:

scan a first UPC on the selected product using a first scanner, the first UPC being indicative of the identity of the pre-selected item;

identify the selected product based on the UPC;

label the selected product with a label corresponding to the identity of the selected product;

scan a second UPC on the label using a second scanner, the second UPC being associated with the identity of a patient intended to receive the pre-selected item;

verify that the pre-selected item and the label correspond; and dispense the selected product from the article dispensing system.

* * * * *